(12) United States Patent
Canavan

(10) Patent No.: US 8,534,158 B2
(45) Date of Patent: Sep. 17, 2013

(54) FLOOR PIVOT PEDAL ASSEMBLY

(75) Inventor: Alan H. Canavan, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 107 days.

(21) Appl. No.: 13/098,658

(22) Filed: May 2, 2011

(65) Prior Publication Data

US 2012/0279346 A1 Nov. 8, 2012

(51) Int. Cl.
*G05G 1/30* (2008.04)
*G05G 1/405* (2008.04)
*B60T 7/06* (2006.01)

(52) U.S. Cl.
CPC .................. *G05G 1/405* (2013.01); *G05G 1/30* (2013.01); *B60T 7/065* (2013.01)
USPC .............................................. 74/512; 74/560

(58) Field of Classification Search
USPC .................. 74/512–514, 539, 542, 560–563; 180/90.6; 200/86.5; 292/145; 70/93
See application file for complete search history.

(56) References Cited

U.S. PATENT DOCUMENTS

| | | | | |
|---|---|---|---|---|
| 1,733,854 A | * | 10/1929 | Bailey | 74/513 |
| 2,167,868 A | * | 8/1939 | Best | 74/513 |
| 7,628,096 B2 | * | 12/2009 | Doucet | 74/560 |
| 2009/0293666 A1 | * | 12/2009 | Kim et al. | 74/513 |
| 2010/0319480 A1 | * | 12/2010 | Nebuya et al. | 74/513 |

* cited by examiner

*Primary Examiner* — James Pilkington
*Assistant Examiner* — Richard Urbanski

(57) ABSTRACT

A floor pivot pedal assembly for use in a vehicle having a floor. The pedal assembly may include a body mounting bracket, a pedal mounting bracket and a floor pivot foot pedal having a lower end pivotally connected to a hinge located on an upper surface of the lower mounting portion. The body mounting bracket has slots for receiving securement flanges for securing the body mounting bracket to the pedal mounting bracket. A fastener also secures the body mounting bracket to the pedal mounting bracket.

7 Claims, 3 Drawing Sheets

FLOOR PIVOT PEDAL ASSEMBLY

BACKGROUND OF INVENTION

The present invention relates generally to floor pivot pedal assemblies used in automotive vehicles and more particularly to installation methods for such assemblies.

Floor pivot pedal assemblies used in automotive vehicles have driver operated foot pedals that pivotally attach at a bottom end (in a heel zone), and pivot on a pivot axis about this bottom end. That is, the top end of the pedal swings in an arc centered about this bottom pivot axis. This is different from other types of foot pedals where the bottom end of the pedal can translate rather than being translationally fixed at a pivot axis centered at the bottom of the pedal. For these floor pivot pedal assemblies, with a pivot hinge, the assembly and installation can be more difficult than for the other types of foot pedals used in vehicles.

Some mount the floor pivot pedal assemblies using ball studs welded to a mounting bracket, complex snap features, and a bolt, to mount the assemblies in the vehicle. However, this type of arrangement is more costly and complex than is desired. Others use fasteners in the heel area to secure the pedal in the vehicle, but the location of these fasteners in a heel area may annoy some drivers and may make the pedal assembly unsightly. Still others us multiple bolts visible to the vehicle driver to secure each pedal assembly in the vehicle. This is not only unsightly, but also may add to the installation time when installing the pedals into vehicles in the vehicle assembly plant since multiple fasteners must be aligned and installed.

SUMMARY OF INVENTION

An embodiment contemplates a floor pivot pedal assembly for use in a vehicle having a floor. The pedal assembly may include a body mounting bracket including an upper body securement flange and a lower body securement flange, each secured to the floor, a lower support portion adjacent to the lower body securement flange, and an upper support portion adjacent to the upper body securement flange, the lower support portion including a pair of pedal support slots each having a wide opening portion adjacent to the lower body securement flange tapering to a narrow opening portion spaced farther from the lower body securement flange than the wide opening portion, and the upper support portion including a fastener hole, and the body mounting bracket including a nut centered about the fastener hole. The pedal assembly may also include a pedal mounting bracket including a lower mounting portion, an upper mounting portion and a middle portion connecting the upper and lower mounting portions, the lower mounting portion including a pair of securement flanges extending downward from a lower surface and extending through the narrow opening portion with each of the securement flanges including a barb extending laterally from the respective securement flange and spaced from the lower surface, the barbs each being wider than a width of the narrow opening portion and narrower than a width of the wide opening portions, and the upper mounting portion including a recessed opening in an upper surface of the upper mounting portion with a fastener head support surface in the recessed opening and a fastener hole in the head support surface. The pedal assembly may also include a floor pivot foot pedal having a lower end pivotally connected to a hinge located on an upper surface of the lower mounting portion and an opposed upper end that is pivotable about a pivot axis defined by the hinge, and a fastener extending through the fastener hole in the fastener head support surface and the fastener hole in the upper support portion, the fastener threadably secured to the nut.

An embodiment contemplates a method of installing a floor pivot pedal assembly to a floor of a vehicle, the method comprising the steps of: securing a body mounting bracket to the floor; aligning a pair of securement flanges extending downward from a pedal mounting bracket with wide opening portions of a pair of pedal support slots in a lower rearward portion of the body mounting bracket, each of the securement flanges including a barb extending therefrom that has a width that is less than a width of the respective wide opening portion; moving the pedal mounting bracket forward and generally horizontally toward the body mounting bracket until the securement flanges pass the wide opening portions into respective narrow opening portions of the pedal support slots, the width of each of the barbs being wider than a respective width of the narrow opening portions whereby the barbs prevent the pedal mounting bracket from being lifted vertically from the body mounting bracket; aligning a fastener hole in a recessed opening in the pedal mounting bracket with a fastener hole located in an upper forward portion of the body mounting bracket; and sliding a fastener through the fastener hole in the pedal mounting bracket and the fastener hole in the body mounting bracket and securing the fastener to a nut on a lower side of the body mounting bracket.

An advantage of an embodiment is that a low cost and robust floor pivot pedal assembly attachment method is achieved. The floor pivot pedal assembly is easy to install, while not having any visible fastener that degrades the appearance of the pedal assembly in the vehicle.

BRIEF DESCRIPTION OF DRAWINGS

FIG. 5 is a side view of a body mounting bracket.

DETAILED DESCRIPTION

Figure 1:
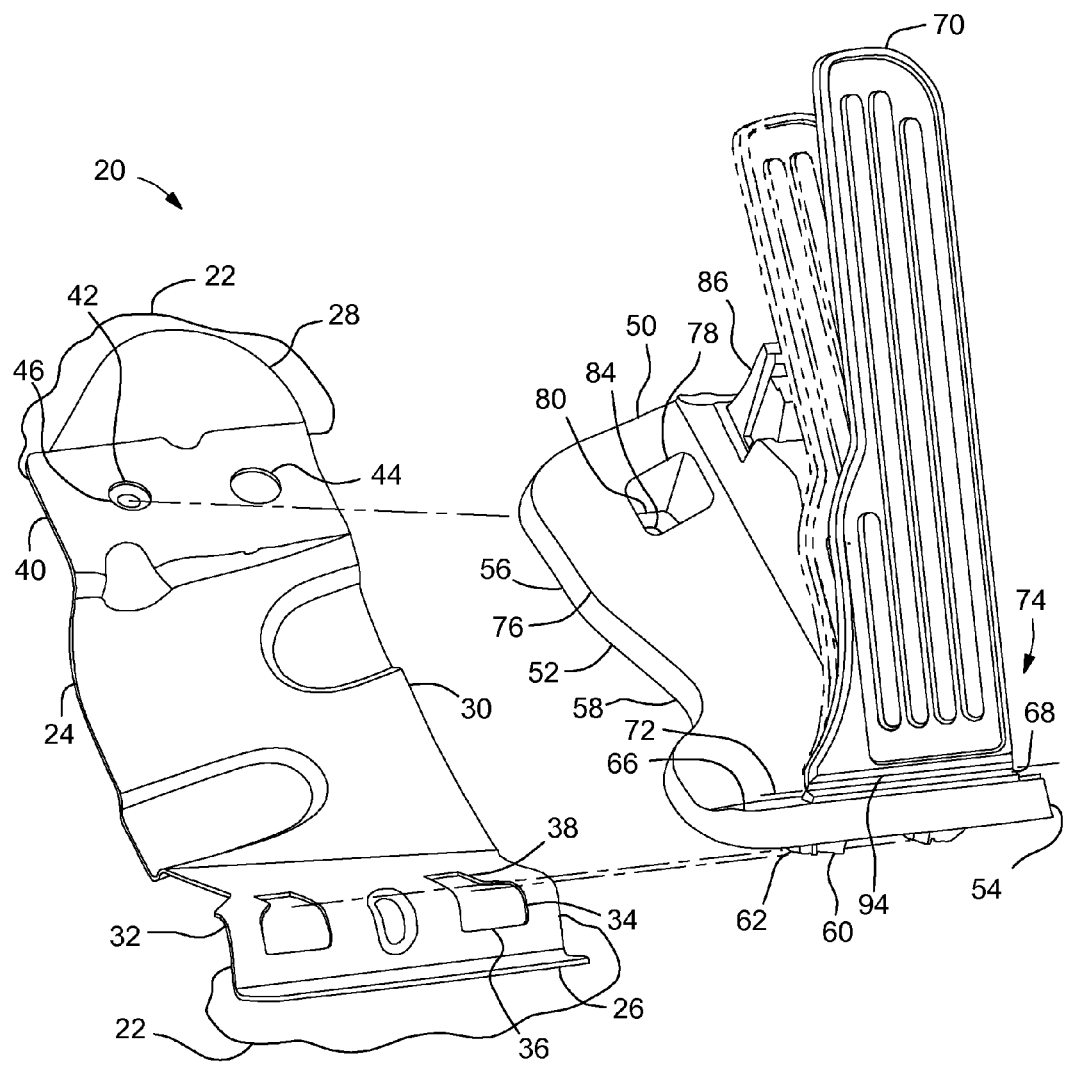
FIG. 1 is a partially exploded, perspective view of a floor pivot pedal assembly in a vehicle.
Figure 2:
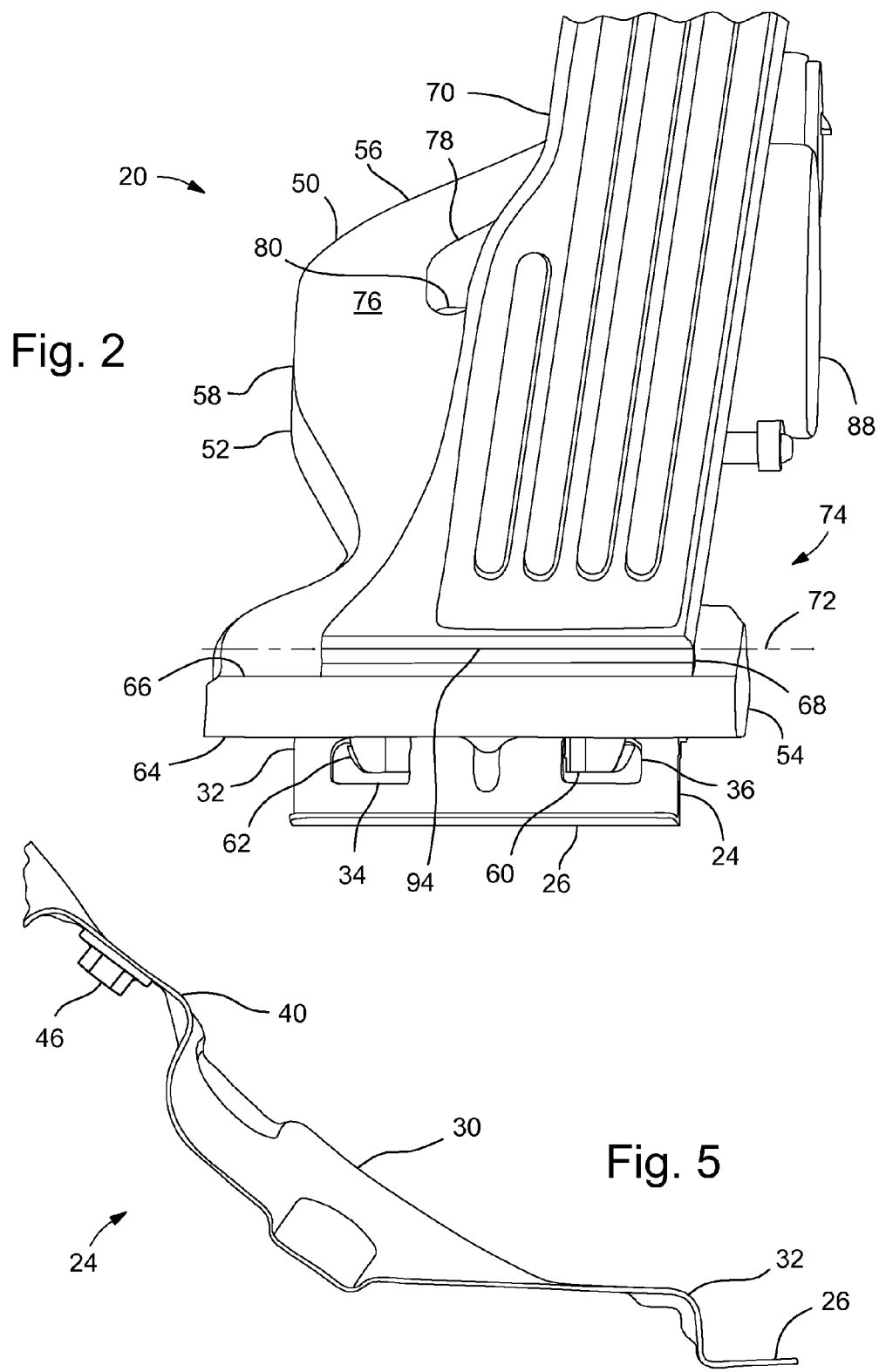
FIG. 2 is a perspective view of a portion of the floor pivot pedal assembly.
Figure 3:
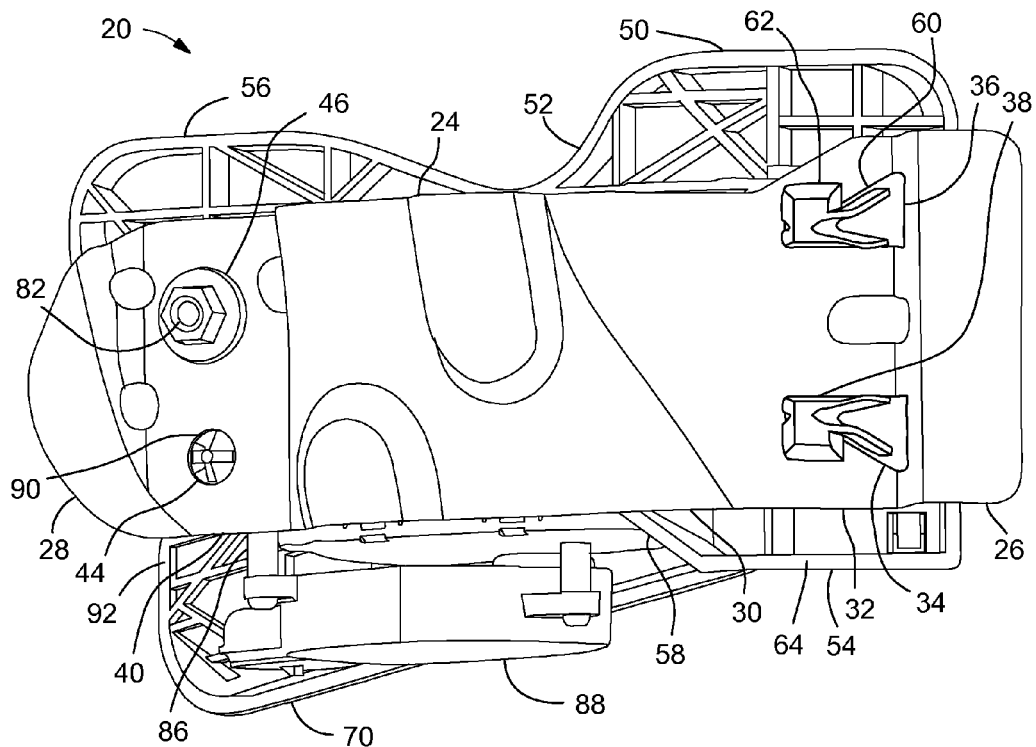
FIG. 3 is a bottom plan view of the floor pivot pedal assembly.
Figure 4:
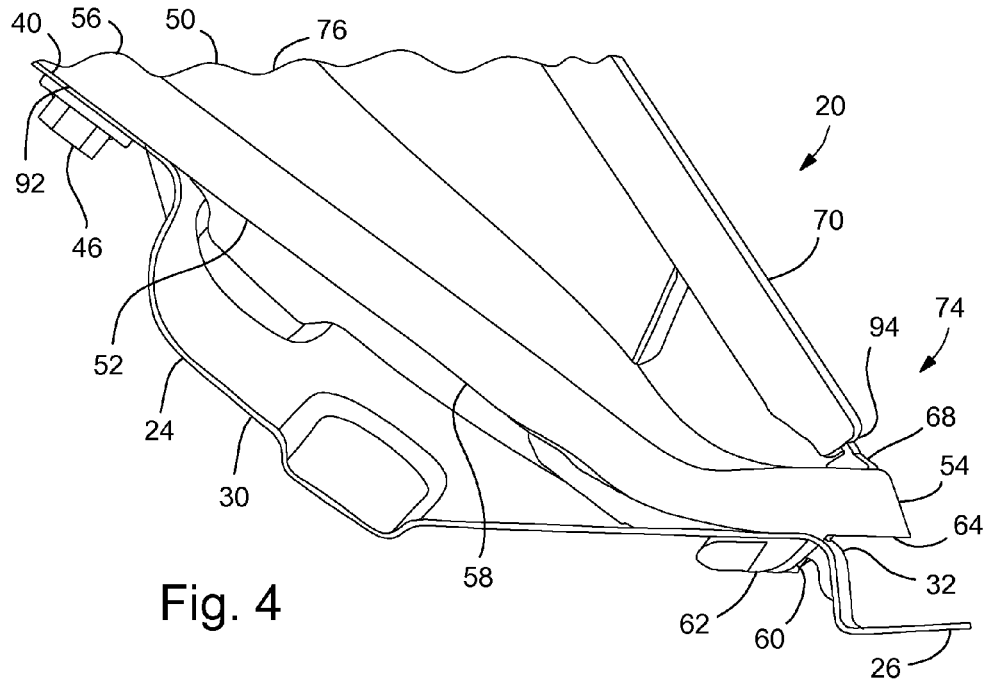
FIG. 4 is a side view of a portion of the floor pivot pedal assembly.

Referring to FIGS. 1-5, a floor pivot pedal assembly 20 mountable to a vehicle floor 22 (shown only in FIG. 1), is shown. The vehicle floor 22 is a portion of the floor in the area of a driver's feet while operating a vehicle.

The floor pivot pedal assembly 20 includes a body mounting bracket 24 having a lower body securement flange 26 and an upper body securement flange 28 that are affixed (such as by welding) to the vehicle floor 22. The upper body securement flange 28 is forward of the lower body securement flange 26—that is, it is located farther forward in the vehicle. The body mounting bracket 24 has a main body portion 30 that extends between the lower and upper securement flanges 26, 28. A lower support portion 32 includes a pair of pedal support slots 34. Each pedal support slot 34 has a lower, wide opening portion 36 that tapers to an upper, narrow opening portion 38 that has a smaller width than the wide opening portion 36. An upper support portion 40 includes a screw hole 42 and a separate alignment pin hole 44. Mounted to the backside of the upper support portion 40 is a securement nut 46 that is centered about the screw hole 42.

The floor pivot pedal assembly 20 also includes a pedal mounting bracket 50, which may be formed from molded plastic. The pedal mounting bracket 50 has a bracket base 52 that includes a lower mounting portion 54, an upper mounting portion 56 and a middle portion 58 extending between the lower and upper portions 54, 56.

The lower mounting portion 54 includes a pair of downward extending securement flanges 60, each having a sideways extending barb 62 spaced from the bottom side 64 of the lower mounting portion 54. These flanges 60 may be integral with the mounting bracket 50 (i.e., molded with the bracket), thus minimizing the cost of the overall assembly. The flanges 60 are spaced apart to align with the pedal support slots 34 in the body mounting bracket 24. The width of each of the wide opening portions 36 of the pedal support slots 34 is large enough to allow the barbs 62 to slide into them, while the width of each of the narrow opening portions 38 of the pedal support slots 34 is narrower than the width of the barbs 62 sufficient to retain the barbs 62. The spacing of the barbs 62 from the bottom side 64 of the mounting bracket 50 is just slightly larger than the thickness of the lower body securement flange 26.

In addition, the lower support portion 32 may be curved at the location of the pedal support slots 34 such that the wide opening portions 36 are on a generally vertically oriented part of the lower support portion 32 and the narrow opening portions 38 are on a generally horizontally oriented part of the lower support portion 32. This may make inserting the securement flange 60 and barbs 62 into the pedal support slots 34 easier.

A top side 66 of the lower mounting portion 54 includes a hinge 68 to which a floor pivot foot pedal 70 is mounted. The hinge 68 defines a pivot axis 72 about which the foot pedal 70 pivots when pressed upon by a driver's foot. This hinge 68 is in a heel zone 74. The heel zone 74 is the area where a driver's heel is located when the driver is operating the foot pedal 70. In FIG. 1, the foot pedal 70 is shown in solid lines in its most rearwardly pivoted position, and in phantom lines in a partially depressed position—illustrating that the pivoting motion is about the pivot axis 72.

The upper mounting portion 56 of the pedal mounting bracket 50 includes an upper surface 76, with a recessed opening 78 in the upper surface that extends down to a fastener head support surface 80. The recessed opening 78 is large enough to receive a head of a securing bolt 82 (shown only in FIG. 3) therein, and preferably deep enough for a bolt head to be recessed below the upper surface 76 after installation. The fastener head support surface 80 includes a bolt hole 84 that aligns with the securement nut 46 when the pedal mounting bracket 50 is properly mounted on the body mounting bracket 24.

The upper mounting portion 56 also includes a position sensor flange 86 to which a pedal position sensor assembly 88 is mounted. This pedal position sensor assembly 88 can be conventional and so will not be discussed further herein.

The upper mounting portion 56 may also include an alignment pin 90 that extends downward from a bottom side 92 of the upper mounting portion 56. The alignment pin 90 may be integral (i.e., molded with) the pedal mounting bracket 50. The alignment pin 90 is located on the pedal mounting bracket 50 so that it aligns with and slides into the alignment pin hole 44 when the pedal mounting bracket 50 is properly aligned with the body mounting bracket 24.

The assembly process for the floor pivot pedal assembly 20 will now be discussed. The body mounting bracket 24 is secured to the vehicle floor 22, whether by welding or other securement means. Also, the bottom end 94 of the foot pedal 70 is mounted, via the hinge 68 to the top side 66 of the lower mounting portion 54. The pedal position sensor assembly 88 is mounted to the foot pedal 70 and the pedal mounting bracket 50.

The pedal mounting bracket 50 is assembled to the body mounting bracket 24. This is accomplished simply and quickly by aligning the securement flanges 60, and barbs 62, with the wide opening portion 36, then sliding the pedal mounting bracket 50 forward until the alignment pin 90 is aligned with the alignment pin hole 44. The alignment pin 90 is slid into the hole 44, which aligns the bolt hole 84 with the securement nut 46. Also, as the pedal mounting bracket 50 is slid forward, the securement flanges 60 will slide into the narrow opening portions 38 of the pedal support slots 34. The securing bolt 82 is inserted into the recessed opening 78 and screwed into the nut 46. The pedal mounting bracket 50 is now fully secured to the body mounting bracket 24, with the barbs 62 holding the lower mounting portion 54 in place and the bolt 82 holding the upper mounting portion 56 in place.

Thus, the floor pivot pedal assembly 20 is installed in the vehicle quickly and easily, with only one bolt needed, and with the bolt being generally out of sight and away from the driver's heel zone.

While certain embodiments of the present invention have been described in detail, those familiar with the art to which this invention relates will recognize various alternative designs and embodiments for practicing the invention as defined by the following claims.

What is claimed is:

1. A floor pivot pedal assembly for use in a vehicle having a floor comprising:
   a body mounting bracket including an upper body securement flange and a lower body securement flange, each secured to the floor, a lower support portion adjacent to the lower body securement flange, and an upper support portion adjacent to the upper body securement flange, the lower support portion including a pair of pedal support slots each having a wide opening portion adjacent to the lower body securement flange tapering to a narrow opening portion spaced farther from the lower body securement flange than the wide opening portion, and the upper support portion including a fastener hole, and the body mounting bracket including a nut centered about the fastener hole;
   a pedal mounting bracket including a lower mounting portion, an upper mounting portion and a middle portion connecting the upper and lower mounting portions, the lower mounting portion including a pair of securement flanges extending downward from a lower surface and extending through the narrow opening portion with each of the securement flanges including a barb extending laterally from the respective securement flange and spaced from the lower surface, the barbs each being wider than a width of the narrow opening portion and narrower than a width of the wide opening portions, and the upper mounting portion including a recessed opening in an upper surface of the upper mounting portion with a fastener head support surface in the recessed opening and a fastener hole in the head support surface;
   a floor pivot foot pedal having a lower end pivotally connected to a hinge located on an upper surface of the lower mounting portion and an opposed upper end that is pivotable about a pivot axis defined by the hinge; and
   a fastener extending through the fastener hole in the fastener head support surface and the fastener hole in the upper support portion, the fastener threadably secured to the nut.

2. The floor pivot pedal assembly of claim 1 wherein the upper support portion includes an alignment pin hole spaced from the fastener hole, and the pedal mounting bracket includes an alignment pin extending downward from the upper mounting portion that extends through the alignment pin hole.

3. The floor pivot pedal assembly of claim 2 wherein the alignment pin is integral with the pedal mounting bracket.

4. The floor pivot pedal assembly of claim 1 wherein the securement flanges and the barbs are integral with the pedal mounting bracket.

5. The floor pivot pedal assembly of claim 1 wherein the lower support portion includes a generally vertical portion and a generally horizontal portion, and the wide opening portions of the pedal support slots are on the generally vertical portion and the narrow opening portions of the pedal support slots are on the generally horizontal portion.

6. The floor pivot pedal assembly of claim 1 including a pedal position sensor assembly that is mounted to the floor pivot foot pedal and the pedal mounting bracket, the pedal position sensor assembly configured to detect the pivoted position of the floor pivot foot pedal relative to the pedal mounting bracket.

7. The floor pivot pedal assembly of claim 1 wherein the floor pivot foot pedal is a floor pivot accelerator pedal.

* * * * *